(No Model.)
H. J. DYKES.
VEHICLE WHEEL TIRE.
No. 565,611. Patented Aug. 11, 1896.
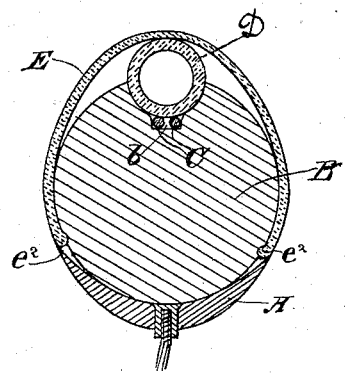
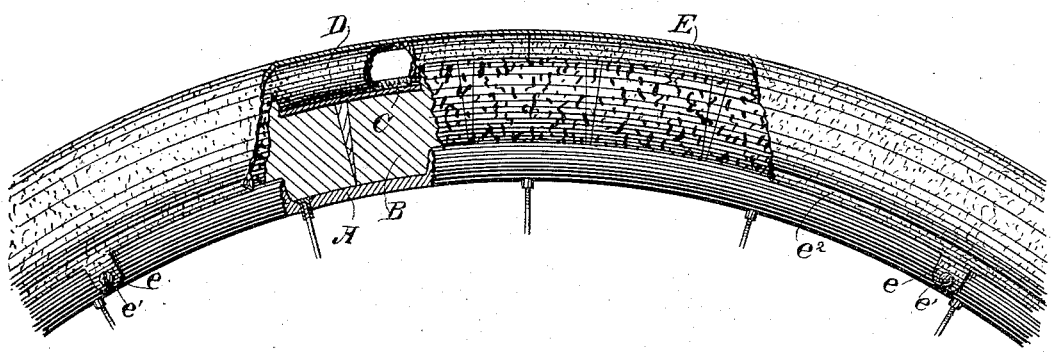
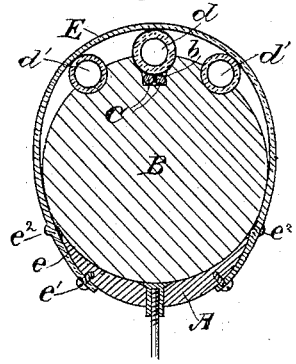
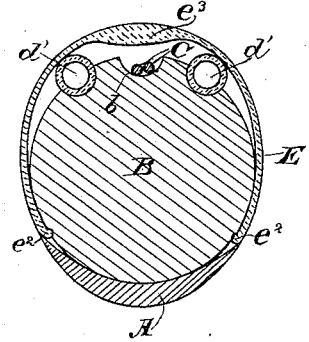
Witnesses:
J. H. Towse
H. F. Ascheck
Inventor,
Hugh J. Dykes
by Dewey & Co.
Attys

UNITED STATES PATENT OFFICE.

HUGH J. DYKES, OF PERALTA, CALIFORNIA.

VEHICLE-WHEEL TIRE.

SPECIFICATION forming part of Letters Patent No. 565,611, dated August 11, 1896.

Application filed January 17, 1896. Serial No. 575,915. (No model.)

*To all whom it may concern:*

Be it known that I, HUGH J. DYKES, a citizen of the United States, residing at Peralta, Alameda county, State of California, have invented an Improvement in Vehicle-Wheel Tires; and I hereby declare the following to be a full, clear, and exact description of the same.

My invention relates to the general class of tires for vehicle-wheels, and especially to the subclass of cushion-tires particularly adapted for bicycles and other vehicles of like character.

My invention consists of the parts and the constructions and combinations of parts forming the improved tire hereinafter described and claimed.

The object of my invention is to provide a tire of the cushion class, which shall be simple in construction, not liable to get out of order, and which will avoid all the difficulties attendant upon the use of pneumatic tires, said cushion-tire being at the same time very light and durable.

Referring to the accompanying drawings, Figure 1 is a cross-section of my tire. Fig. 2 is a side view, portions being broken away. Fig. 3 shows a modified arrangement of cushions. Fig. 4 shows another modified arrangement of cushions.

A is the rim of the wheel. To this rim is fitted the cork B, which is made in any number of sections. These sections are cemented into the rim, but in order to hold them firmly thereto I tie them circumferentially by the line C. This line may be of any suitable character, a string or a wire, but my present idea is to use catgut. In order to apply this tie properly to the cork, I make circumferentially in the cork a groove $b$, and in this groove the tying-line is seated. Thus the cork body of the tire is held very firmly and perfectly to the rim of the wheel and is not liable to be displaced.

In practice I intend to treat the cork B with a coating of rubber cement or other suitable material to protect it from moisture. In connection with this cork body of the tire my invention contemplates the employment of a separate cushion of a more pronounced nature than the cork itself affords. One form in which I would apply this cushion consists of a circumferentially-directed piece D, which is preferably made of rubber. It may be solid, but its preferable form, on account of lightness and resiliency, is that of a tube. This cushion-piece is seated in the cork body in the enlarged upper part of the circumferential groove in which the tying-line lies, and said cushion extends down into said groove so that a good portion of its body remains projecting above the general surface of the cork body, and, being held in the groove, will act as a perfect cushion. The ends of this cushion need not be joined, but may simply come close together, so that the air therein may not interfere with the proper effect of the cushion. In other cases I may use three circumferentially-directed cushions, the middle one, $d$, being smaller than the single one D heretofore described, and the ones on each side, $d'$, being of about the same diameter as the middle one, and said side cushions will be seated in grooves in the cork body in the same manner as the central one is. These three will preserve the general rotundity of the tire.

In all cases there is a covering E for the tire. This consists of an annular rubber sheet made sufficiently smaller in diameter than the tire to enable it to be stretched tightly over it. This cover is to be cemented to the sides of the cork, but in order to insure its remaining in place and not slipping I form it with side lugs $e$, which are adapted to be secured to the rim A of the wheel by any suitable means, such as by the small screws $e'$. The edges of this covering, in order to prevent them from tearing, are formed with a thickened rib or flange $e^2$, which finds a seat and housing within the edges of the rim A. When this covering is employed with the single central cushion D, the tread of the wheel is wholly upon said cushion, which gives the desired narrowness of tread and the consequent reduction to a minimum of friction. It also leaves a circumferential air-space on each side, which will increase the cushion effect. When used with the three cushions, its tread is widened and its rotundity preserved. In some cases, however, I may omit the central cushion D as applied to the cork body, using only the side cushions $d'$, and in this case it will be observed that I form the covering E with a central thickened portion $e^3$, which, bearing down in the central groove $b$ of the cork body, yields sufficiently in the space between the side cushions to form the desired central cushion.

Having thus described my invention, what I claim as new, and desire to secure by Letters Patent, is—

1. A vehicle-wheel tire consisting of a body composed of cork circumferentially grooved, a tie-line seated in said groove whereby the cork is held to the rim, an independent cushion circumferentially directed and seated in said groove and a covering over said cushion and body.

2. A vehicle-wheel tire consisting of a body composed of cork circumferentially grooved and tied, a series of parallel cushions seated in circumferential grooves in the tread of said body and a suitable covering over said cushions and body.

3. A vehicle-wheel tire consisting of a body composed of cork having its center circumferentially grooved, side cushions circumferentially directed in grooves parallel with the central groove and a cover over said body and having a thickened circumferential center adapted to lie over the central groove in the cork body.

4. A vehicle-wheel tire consisting of a body composed of cork circumferentially grooved and provided with a tie-line in said groove, side cushions circumferentially directed in grooves parallel with the tie-line groove, and a cover over the body and provided with a thickened circumferential center adapted to lie over the tie-line groove of the body.

5. A vehicle-wheel tire consisting of a body composed of cork circumferentially grooved, a tie-line in said groove, a circumferentially-directed cushion applied to said cork, and a cover over the cork and cushion and consisting of an annular flexible sheet having side lugs to be secured to the rim, said sheet having its edges thickened.

In witness whereof I have hereunto set my hand.

HUGH J. DYKES.

Witnesses:
S. H. NOURSE,
JESSIE C. BRODIE.